(12) United States Patent
Mizuno

(10) Patent No.: US 7,558,173 B2
(45) Date of Patent: Jul. 7, 2009

(54) DISK DEVICE AND CONTROL METHOD THEREFORE

(75) Inventor: Takao Mizuno, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 702 days.

(21) Appl. No.: 11/344,077

(22) Filed: Feb. 1, 2006

(65) Prior Publication Data

US 2006/0171692 A1     Aug. 3, 2006

(30) Foreign Application Priority Data

Feb. 2, 2005     (JP) ................ P2005-026135

(51) Int. Cl.
*G11B 7/00* (2006.01)
(52) U.S. Cl. .............. 369/53.1; 369/53.24; 369/47.53
(58) Field of Classification Search .............. 369/47.53, 369/47.51, 53.1, 53.22, 53.24, 116, 53.32, 369/53.35, 53.28, 53.11
See application file for complete search history.

(56) References Cited

U.S. PATENT DOCUMENTS 6,400,667 B1 * 6/2002 Utsumi et al. ............ 369/53.34

FOREIGN PATENT DOCUMENTS

| JP | 2002-288849 A | 10/2002 |
|----|---------------|---------|
| JP | 2002-312939   | 10/2002 |
| JP | 2004-22084    | 1/2004  |
| JP | 2004-234812   | 8/2004  |

\* cited by examiner

*Primary Examiner*—Nabil Z Hindi
(74) *Attorney, Agent, or Firm*—Morgan, Lewis & Bockius LLP

(57) ABSTRACT

A disk device which performs recording and reproduction of an audio-visual signal for an optical disk, includes: a determination unit for determining whether an optical disk loaded into the disk device is an unrecorded disk; a reading unit for reading arbitrary ASCII code recorded in advance at the head of an ECC block of a PCA on the optical disk, when the determination unit determines that the optical disk loaded into the disk device is an unrecorded disk; and an adjustment unit for appropriately adjusting a defocused positioning of an optical pickup, so that jitter of an RF signal read by the optical pickup is minimized at the head of the ECC block, when the arbitrary ASCII code is recorded in advance at the head of the ECC block of the PCA on the optical disk.

5 Claims, 3 Drawing Sheets

DISK DEVICE AND CONTROL METHOD THEREFORE

BACKGROUND OF THE INVENTION

1. Field of the Invention

The present invention relates to a disk device for recording an audio-visual signal on, and reproducing the audio-visual signal from, an optical disk, and a control method therefore, and relates particularly to a disk device that can appropriately adjust the defocused positioning of an unrecorded disk, and a control method therefore.

2. Description of the Related Art

Conventionally, an audio-visual signal is recorded on an unrecorded disk while defocusing of an optical pickup is adjusted by referring, for example, to a predetermined fixed value. Thus, depending on the type of optical disk mounted in a disk device, defocusing of an optical pickup can not be appropriately adjusted, and since then the optical pickup can not record using a laser beam at its optimal recording power, the quality of the recorded audio-visual signal is deteriorated. Further, during a process for the recording of a test signal in a predetermined area on an optical disk, performed in order to correct the defocusing of an optical pickup, an optimal laser power can not be designated for the optical pickup, either because of the repetitive overwriting of test signals or because the quality of the audio-visual signal recorded on the optical disk is deteriorated.

There is a related art wherein a test signal is recorded by gradually changing the laser power employed for the recording of an optical disk, and the recording quality is calculated, by reproducing the test signal, to obtain for the defocused state of the optical pickup an offset value that is then used to correct the recording power of the optical pickup (see, for example, JP-A-2002-312939).

There is another related art wherein, when the image forming level of a reproduction laser beam, emitted by an optical pickup, is too high for the reproduction of a test signal recorded on an optical disk, the imaging forming level is reduced, and based on an asynchronism of the test signal, the recording laser power provided for the optical pickup is adjusted (see, for example, JP-A-2004-22084).

There is an additional related art wherein, when a predetermined amount of data has been recorded on an optical disk, the recording of data is halted, the state wherein data are being recorded on the optical disk is examined, and the laser power to be provided for the optical pickup, for subsequent recording, is determined (see, for example, JP-A-2004-234812).

SUMMARY OF THE INVENTION

According to the first related art, a test signal is recorded by gradually changing the laser power employed for the recording of an optical disk, and the recording quality is calculated, by reproducing the test signal, to obtain for the defocused state of the optical pickup an offset value that is used to correct the recording power of the optical pickup. With this method, the optimal recording power of a laser beam can be determined, based on the quality of a reproduction of a test signal that is recorded on the optical disk; however, the problems described above can not be solved.

According to the second related art, when the image forming level of the reproduction laser beam of an optical pickup is too high for the reproduction of a test signal recorded on an optical disk, the image forming level is reduced, and the recording laser power of the optical pickup is adjusted, based on an asynchronism of the test signal. With this method, when the image forming level of the laser power is too high, the image forming level can be reduced and an optimal power can be determined for the laser; again, however, the problems described above can not be solved.

According to the third related art, when a predetermined amount of data has been recorded on an optical disk, data recording is halted, the state wherein data are being recorded on the optical disk is examined, and the laser power to be provided for the optical pickup, for subsequent recording, is determined. With this method, the laser power can be appropriately designated in accordance with a rise in the temperature of the laser source for the optical pickup; once more, however, the above described problems can not be solved.

Therefore, in order to resolve the above described problems, the objective of the present invention is to provide a disk device that can appropriately adjust defocused positioning, relative to an unrecorded optical disk, to improve the recording quality of an audio-visual signal.

To achieve this objective, according to the invention, a disk device, which performs, for an optical disk, recording/reproduction of an audio-visual signal, includes: a determination unit, for determining whether an optical disk loaded into the disk device is an unrecorded disk; a reading unit, for, when the determination unit determines that the optical disk loaded into the disk device is an unrecorded disk, reading arbitrary ASCII code recorded in advance at the head of an ECC block of a PCA on the optical disk; and an adjustment unit, for, when the arbitrary ASCII code is recorded in advance at the head of the ECC block of the PCA on the optical disk, appropriately adjusting a defocused positioning of an optical pickup, so that at the head of the ECC block, jitter of an RF signal read by the optical pickup is minimized.

When the arbitrary ASCII code is not recorded at the head of the ECC block of the PCA on the optical disk, the adjustment unit records, as a test, arbitrary ASCII code at the head of the ECC block of the PCA on the optical disk, and appropriately adjusts the defocused positioning of the optical pickup, so that at the head of the ECC block, jitter of an RF signal read by the optical pickup is minimized.

When the determination unit determines that the optical disk loaded into the disk device is not an unrecorded disk, the adjustment unit appropriately adjusts the defocused positioning of the optical pickup, so that in a recorded area of the optical disk, jitter of an RF signal read by the optical pickup is minimized.

With these units, even for an unrecorded disk, defocused positioning can be appropriately adjusted, and the recording quality of an audio-visual signal can be improved.

According to a disk drive of a first aspect of the invention, whether an optical disk loaded into a disk device is an unrecorded disk is determined, and when it is determined that the optical disk loaded in the disk device is an unrecorded disk, the head of the ECC block of the PCA on the optical disk is scanned to determine whether arbitrary ASCII code has been recorded in advance. When arbitrary ASCII code has been recorded at the head of the ECC block of the PCA on the optical disk, the defocused positioning of the optical pickup is appropriately adjusted, so that at the head of the ECC block, jitter of an RF signal read by the optical pickup is minimized. When arbitrary ASCII code has not been recorded at the head of the ECC block of the PCA on the optical disk, arbitrary ASCII code is recorded thereat, as a test, and the defocused positioning of the optical pickup is appropriately adjusted, so that at the head of the ECC block, jitter of an RF signal read by the optical pickup is minimized. When it is determined that the optical disk loaded into the disk device is not an unrecorded disk, the defocused positioning of the optical pickup is appropriately adjusted, so that in the recorded area of the optical disk, jitter of an RF signal read by the optical pickup is minimized. With this arrangement, deterioration of the recording quality due to repetitive overwriting of test signals is prevented, and even for an unrecorded optical disk, the defocused positioning can be appropriately adjusted, and the recording quality of an audio-visual signal can be improved.

According to a disk drive of a second aspect of the invention, whether an optical disk loaded into the disk device is an unrecorded disk is determined, and when the determination is that the optical disk loaded in the disk device is an unrecorded disk, the head of the ECC block of the PCA of the optical disk is scanned to determine whether arbitrary ASCII code has been recorded in advance. When arbitrary ASCII code has been recorded at the head of the ECC block of the PCA of an optical disk, the defocused positioning of the optical pickup is appropriately adjusted, so that at the head of the ECC block, jitter of an RF signal read by the optical pickup is minimized. With this arrangement, even for an unrecorded optical disk, the defocused positioning can be appropriately adjusted, and the recording quality of an audio-visual signal can be improved.

According to a disk device of a third aspect of the invention, when arbitrary ASCII code has not been recorded at the head of the ECC block of the PCA on the optical disk, arbitrary ASCII code is recorded thereat, as a test, and the defocused positioning of the optical pickup is appropriately adjusted, so that at the head of the ECC block, jitter of an RF signal read by the optical pickup is minimized. With this arrangement, deterioration of the recording quality due to repetitive overwriting of test signals is prevented, and even for an unrecorded optical disk, the defocused positioning can be appropriately adjusted, and the recording quality of an audio-visual signal can be improved.

According to a disk device of a fourth aspect of the invention, when it is determined that an optical disk loaded into the disk device is not an unrecorded disk, the defocused positioning of the optical pickup is appropriately adjusted, so that in the recorded area of the optical disk, jitter of an RF signal read by the optical pickup is minimized. With this arrangement, deterioration of the recording quality due to repetitive overwriting of test signals is prevented, and even for a recorded optical disk, the defocused positioning can be appropriately adjusted, and the recording quality of an audio-visual signal can be improved.

According to a disk device control method of a fifth aspect of the invention, whether an optical disk loaded into a disk device is unrecorded disk is determined, when it is determined that the optical disk loaded into a disk device is an unrecorded disk, whether arbitrary ASCII code is present at the head of an ECC block of a PCA on the optical disk is determined, and when it is determined that the optical disk is an unrecorded disk and that arbitrary ASCII code is present at the head of an ECC block of a PCA on the optical disk, the defocused positioning of an optical pickup is appropriately adjusted, so that at the head of the ECC block, jitter of an RF signal read by the optical pickup is minimized. When the optical disk is an unrecorded disk, and when arbitrary ASCII code has not been recorded at the head of the ECC block of the PCA of the optical disk, the arbitrary ASCII code is recorded thereat, as a test, and the defocused positioning of the optical pickup is appropriately adjusted, so that at the head of the ECC block, jitter of an RF signal read by the optical pickup is minimized. When the optical disk is not an unrecorded disk, the defocused positioning of the optical pickup is appropriately adjusted, so that in a recorded area of the optical disk, jitter of an RF signal read by the optical pickup is minimized.

With this arrangement, deterioration of the recording quality due to repetitive overwriting of test signals is prevented, and even for an unrecorded optical disk, the defocused positioning can be appropriately adjusted, and the recording quality of an audio-visual signal can be improved. Further, also for a recorded optical disk, the defocused positioning can be appropriately adjusted, and the recording quality of an audio-visual signal can be improved.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Figure 1:
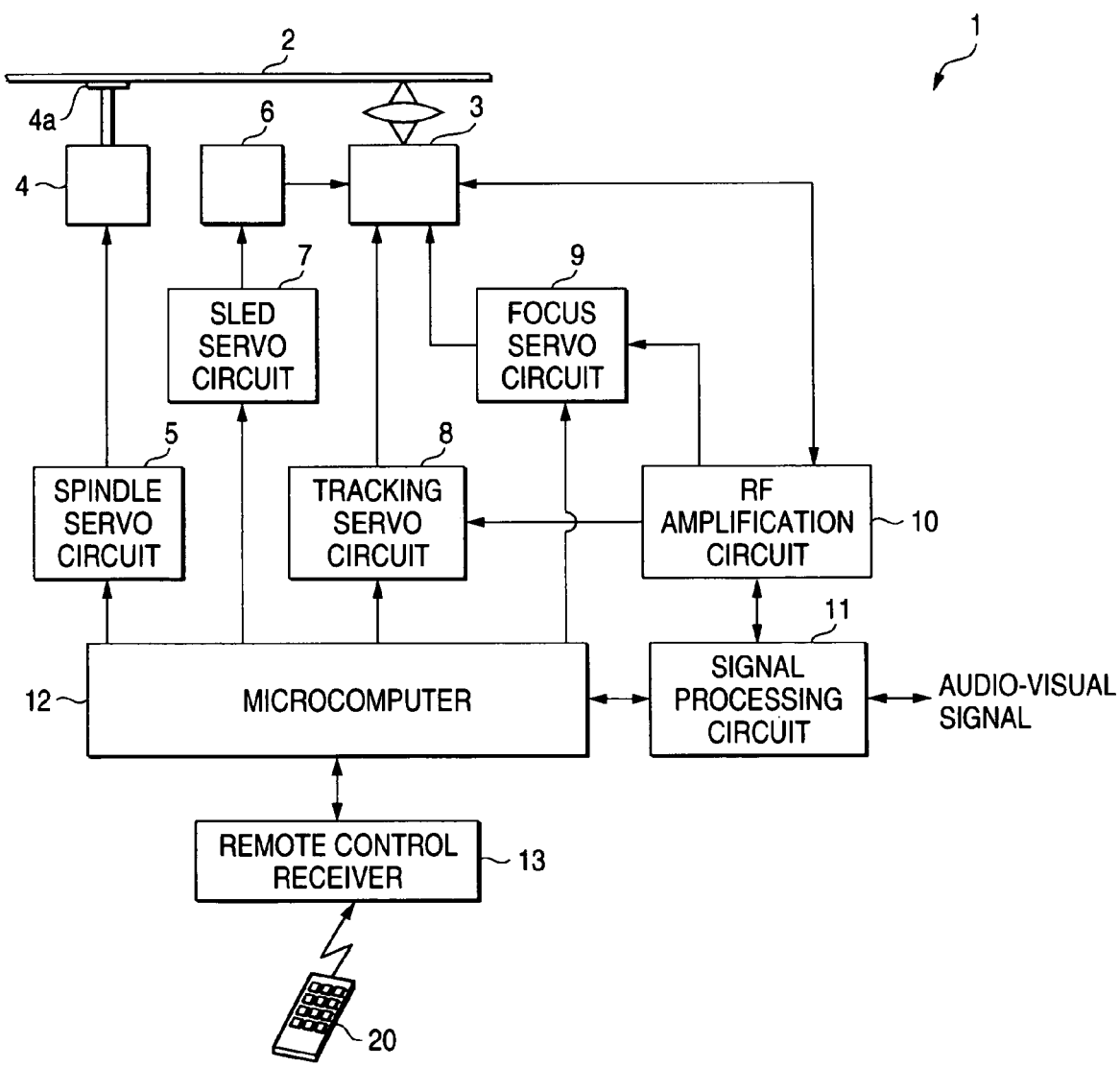
FIG. 1 is a block diagram showing the configuration of a disk device according to one embodiment of the present invention.
Figure 2:
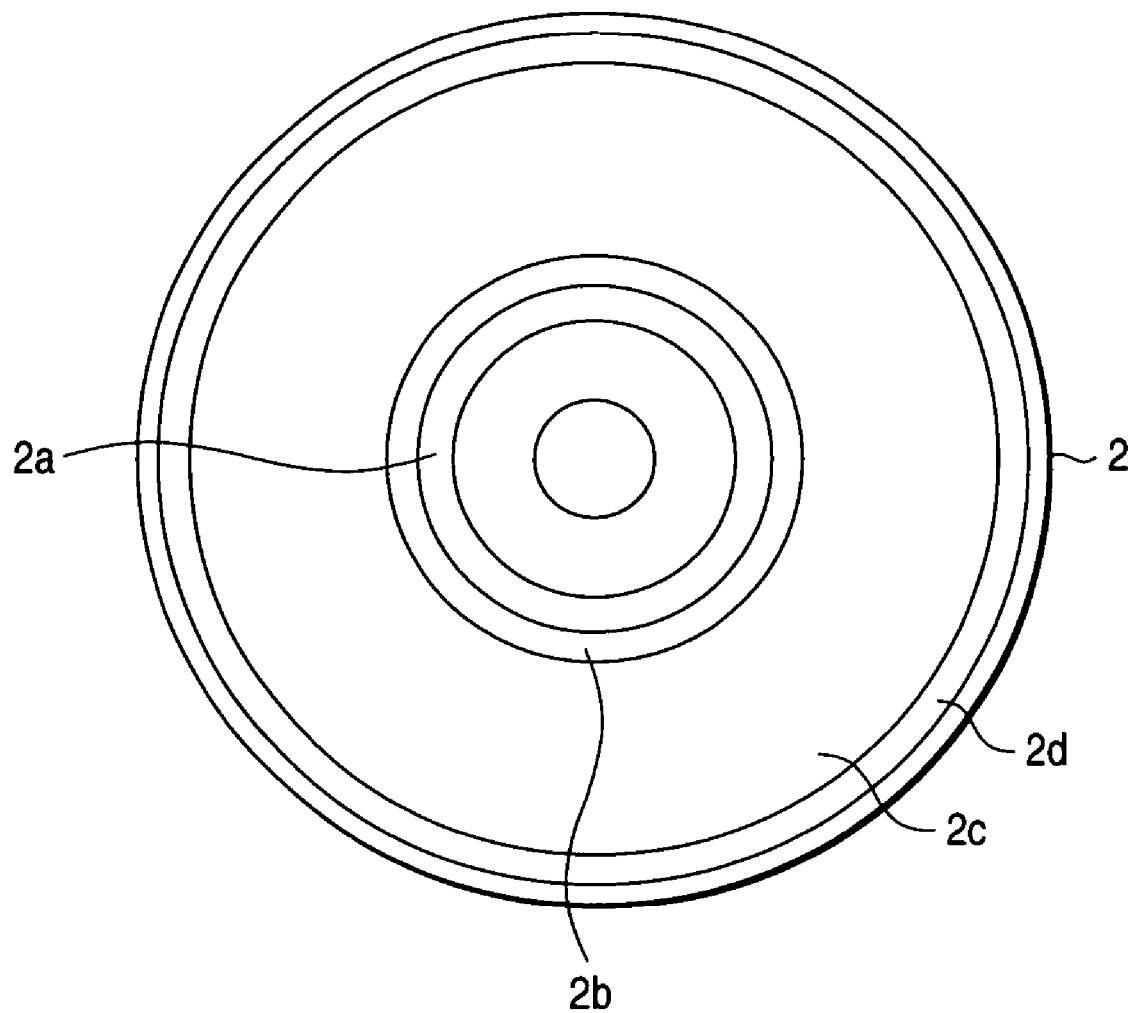
FIG. 2 is an explanatory diagram showing the individual areas on an optical disk.
Figure 3:
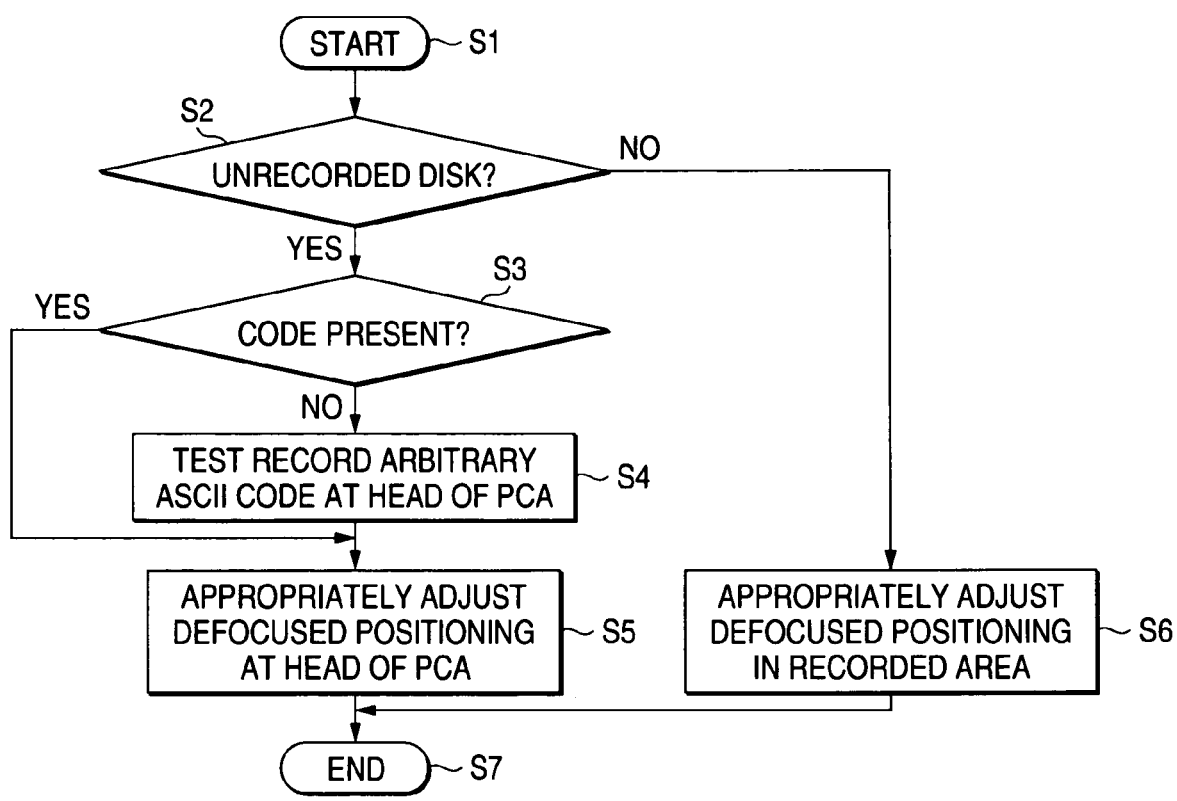
FIG. 3 is a flowchart showing the operation of the disk device according to the embodiment of the invention.

The preferred embodiment of the present invention will now be described in detail while referring to the accompanying drawings. FIG. 1 is a block diagram showing the configuration of a disk device according to the embodiment of the invention. FIG. 2 is a diagram for explaining the individual areas of an optical disk. And FIG. 3 is a flowchart showing the operation of the disk device according to the embodiment of the invention.

First, the configuration of the disk device for this embodiment will be explained while referring to the block diagram in FIG. 1. A disk device 1 includes: an optical pickup 3, for emitting a laser beam to irradiate an optical disk 2 and record an audio-visual signal thereon, and to detect a laser beam reflected from the optical disk 2 and read an audio-visual signal recorded thereon; a spindle motor 4, for rotating the optical disk 2 placed on a turn table 4a; a spindle servo circuit 5, for providing servo control for the rotational speed of the spindle motor 4; a thread motor 6, for performing thread shifting of the optical pickup 3 in the radial direction of the optical disk 2; a thread servo circuit 7, for providing servo control for the rotational direction and the rotational speed of the thread motor 6; a tracking servo circuit 8, for providing servo control, for the tracking of the optical pickup 3, based on a tracking error signal detected by the optical pickup 3; a focus servo circuit 9, for providing servo control, for the focusing of the optical pickup 3, based on a focus error signal detected by the optical pickup 3; an RF amplification circuit 10, for amplifying a tracking error signal, a focus error signal, an RF signal and an audio-visual signal, which are detected by the optical pickup 3, and an audio-visual signal to be recorded on the optical disk 2; a signal processing circuit 11, for employing a reference clock to synchronously detect and demodulate an audio-visual signal read by the optical pickup 3, and for correcting an error in the demodulated audio-visual signal, for expanding an audio-visual signal that is compressed using a predetermined compression system, for decoding the expanded signal to reproduce an audio-visual signal, and for encoding an audio-visual signal input at an external input terminal (not shown) and compressing the encoded audio-visual signal based on a predetermined compression system; a micro computer 12, for controlling the entire system of the disk device 1; and a remote control receiver 13, for receiving an infrared remote control signal from a remote controller 20 and converting this signal into a predetermined electric signal.

The operation of the disk device having this configuration will now be described.

When the optical disk 2 is placed on the turn table 4a of the disk device 1, the micro computer 12 transmits a control signal to the spindle servo circuit 5, which then drives the spindle motor 4 to rotate the optical disk 2. The micro computer 12 also transmits a control signal to a thread servo circuit 7, which then drives the thread motor 6 to perform thread shifting of the optical pickup 3 to a lead-in area 2b (see FIG. 2) of the optical disk 2. The micro computer 12 further transmits a control signal to the tracking servo circuit 8 and the focus servo circuit 9, which then provide servo control for the tracking and the focusing of the optical pickup 3. The optical pickup 3 reads a TOC (Table Of Contents) from the lead-in area 2b of the optical disk 2 to determine whether the optical disk 2, mounted on the turn table 4a of the disk device 1, is an unrecorded disk.

When the optical disk 2 mounted on the turn table 4a of the disk device 1 is an unrecorded disk, the micro computer 12 transmits a control signal to the spindle servo circuit 5, which then drives the spindle motor 4 to rotate the optical disk 2. The micro computer 12 also transmits a control signal to the thread servo circuit 7, which then drives the thread motor 6 to perform thread shifting of the optical pickup 3 to a PCA (Power Calibration Area) 2a (see FIG. 2) located inward from the lead-in area 2b of the optical disk 2. The micro computer 12 further transmits a control signal to the tracking servo circuit 8 and the focus servo circuit 9, which then provide servo control for the tracking and focusing of the optical pickup 3, in order to read arbitrary ASCII code recorded in advance at the head of the ECC (Error Correction Code) block of the PCA 2a on the optical disk 2 by the optical pickup 3. When arbitrary ASCII code is not recorded at the head of the ECC block of the PCA 2a on the optical disk 2, the micro computer 12 transmits control signals to the tracking servo circuit 8 and the focus servo circuit 9, which then provide servo control for the tracking and focusing of the optical pickup 3. Thus, using the optical pickup 3, arbitrary ASCII code is recorded, as a test, at the head of the ECC block of the PCA 2a on the optical disk 2, and the defocused positioning of the optical pickup 3 is appropriately adjusted, so that at the head of the ECC block, jitter of an RF signal read by the optical pickup 3 is minimized.

Furthermore, when arbitrary ASCII code is present at the head of the ECC block of the PCA 2a (see FIG. 2) on the optical disk 2 that is mounted on the turn table 4a of the disk device 1, the micro computer 12 transmits control signals to the tracking servo circuit 8 and the focus servo circuit 9 to provide servo control for the tracking and the focusing of the optical pickup 3. And the defocused positioning of the optical pickup 3 is adjusted, so that at the head of the ECC block, jitter of an RF signal read by the optical pickup 3 is minimized.

When the optical disk 2 mounted on the turn table 4a of the disk device 1 is not an unrecorded disk, the micro computer 12 transmits a control signal to the spindle servo circuit 5, which then drives the spindle motor 4 to rotate the optical disk 2. The micro computer 12 also transmits a control signal to the thread servo circuit 7, which then drives the thread motor 6 to perform thread shifting of the optical pickup 3 to a data recording area 2c (see FIG. 2), located between the lead-in area 2b and a lead-out area 2d of the optical disk 2. The micro computer 12 further transmits control signals to the tracking servo circuit 8 and the focus servo circuit 9 to perform the tracking and focusing of the optical pickup 3, and the defocused positioning of the optical pickup 3 is appropriately adjusted, so that in the area of the optical disk 2 recorded using the optical pickup 3, jitter of an RF signal read by the optical pickup 3 is minimized.

The operation of the disk device for this embodiment will now be described while referring to the flowchart in FIG. 3.

When the optical-disk is mounted on the turn table of the disk device, program control advances from step S1 to step S2. At step S2, a check is performed to determine whether the optical disk mounted on the turn table of the disk device is an unrecorded disk. When the optical disk placed on the turn table of the disk device is an unrecorded disk, program control advances to step S3. However, when the optical disk mounted on the turn table of the disk device is not an unrecorded disk, program control is shifted to step S6.

At step S3, a check is performed to determine whether arbitrary ASCII code is present at the head of the ECC block of the PCA on the optical disk. When arbitrary ASCII code is present at the head of the ECC block of the PCA on the optical disk, program control is shifted to step S5. However, when arbitrary ASCII code is not recorded at the head of the ECC block of the PCA on the optical disk, program control advances to step S4.

At step S4, arbitrary ASCII code is recorded, as a test, at the head of the ECC block, and program control advances to step S5.

At step S5, the defocused positioning of the optical pickup is appropriately adjusted, so that at the head of the ECC block, jitter of an RF signal read by the optical pickup is minimized. Program control thereafter advances to step S7, where the processing is terminated.

At step S6, the defocused positioning of the optical pickup is appropriately adjusted, so that in the recorded area of the optical disk, jitter of an RF signal read by the optical pickup is minimized. Program control thereafter advances to step S7, where the processing is terminated.

The preferred embodiment of the invention has been explained in detail. However, the present invention is not limited to this embodiment, and can, of course, be variously modified and improved within the scope of the technical knowledge of one having ordinary skill in the art.

What is claimed is:

1. A disk device which performs recording and reproduction of an audio-visual signal for an optical disk, comprising:
   a determination unit for determining whether an optical disk loaded into the disk device is an unrecorded disk;
   a reading unit for reading arbitrary ASCII code recorded in advance at the head of an ECC block of a PCA on the optical disk, when the determination unit determines that the optical disk loaded into the disk device is an unrecorded disk; and
   an adjustment unit for appropriately adjusting a defocused positioning of an optical pickup so that jitter of an RF signal read by the optical pickup is minimized at the head of the ECC block, when the arbitrary ASCII code is recorded in advance at the head of the ECC block of the PCA on the optical disk, for recording arbitrary ASCII code at the head of the ECC block of the PCA on the optical disk as a test, and appropriately adjusting the defocused positioning of the optical pickup, so that jitter of an RF signal read by the optical pickup is minimized at the head of the ECC block, when the arbitrary ASCII code is not recorded at the head of the ECC block of the PCA on the optical disk, and for appropriately adjusting the defocused positioning of the optical pickup, so that jitter of an RF signal read by the optical pickup is minimized in a recorded area of the optical disk, when the determination unit determines that the optical disk loaded into the disk device is not an unrecorded disk.

2. A disk device which performs recording and reproduction of an audio-visual signal for an optical disk, comprising:

a determination unit for determining whether an optical disk loaded into the disk device is an unrecorded disk;

a reading unit for reading arbitrary ASCII code recorded in advance at the head of an ECC block of a PCA on the optical disk, when the determination unit determines that the optical disk loaded into the disk device is an unrecorded disk; and an adjustment unit for appropriately adjusting a defocused positioning of an optical pickup, so that jitter of an RF signal read by the optical pickup is minimized at the head of the ECC block, when the arbitrary ASCII code is recorded in advance at the head of the ECC block of the PCA on the optical disk.

3. The disk device according to claim 2, wherein when the arbitrary ASCII code is not recorded at the head of the ECC block of the PCA on the optical disk, the adjustment unit records arbitrary ASCII code at the head of the ECC block of the PCA on the optical disk as a test, and appropriately adjusts the defocused positioning of the optical pickup, so that jitter of an RF signal read by the optical pickup is minimized at the head of the ECC block.

4. The disk device according to claim 2, wherein when the determination unit determines that the optical disk loaded into the disk device is not an unrecorded disk, the adjustment unit appropriately adjusts the defocused positioning of the optical pickup, so that jitter of an RF signal read by the optical pickup is minimized in a recorded area of the optical disk.

5. A method for controlling disk device that performs recording and reproduction of an audio-visual signal for an optical disk, comprising:

determining whether an optical disk loaded into a disk device is an unrecorded disk;

determining whether arbitrary ASCII code is present at the head of an ECC block of a PCA on the optical disk, when the optical disk loaded into the disk device is an unrecorded disk;

appropriately adjusting the defocused positioning of an optical pickup, so that jitter of an RF signal read by the optical pickup is minimized at the head of the ECC block, when the optical disk is an unrecorded disk and when arbitrary ASCII code is present at the head of an ECC block of a PCA on the optical disk;

recording the arbitrary ASCII code thereat as a test, and appropriately adjusting the defocused positioning of the optical pickup, so that jitter of an RF signal read by the optical pickup is minimized at the head of the ECC block, when the optical disk is an unrecorded disk, and when arbitrary ASCII code has not been recorded at the head of the ECC block of the PCA of the optical disk; and appropriately adjusting the defocused positioning of the optical pickup, so that jitter of an RF signal read by the optical pickup is minimized in a recorded area of the optical disk, when the optical disk is not an unrecorded disk.

* * * * *